United States Patent [19]
Poff

[11] 4,417,477
[45] Nov. 29, 1983

[54] TRAIN GAGE MEASUREMENT CIRCUIT FOR HIGH TEMPERATURE APPLICATIONS USING HIGH VALUE COMPLETION RESISTORS

[75] Inventor: Ronald I. Poff, West Covina, Calif.

[73] Assignee: Eaton Corporation, Cleveland, Ohio

[21] Appl. No.: 259,563

[22] Filed: May 11, 1981

[51] Int. Cl.³ .............................................. G01B 7/18
[52] U.S. Cl. ................................ 73/766; 324/DIG. 1
[58] Field of Search .................. 73/766, 362 AR, 204, 73/765; 324/DIG. 1; 323/365, 366, 367

[56] References Cited
U.S. PATENT DOCUMENTS 3,453,536  7/1969  Lode .......................... 73/362 AR X Primary Examiner—Jerry W. Myracle
Attorney, Agent, or Firm—Kevin Redmond

[57] ABSTRACT

A Wheatstone bridge circuit for a strain gage designed to eliminate the zero offset due to heated cables occurring when the active elements of the bridge circuit are elevated to high temperatures. The bridge circuit comprises an active, a dummy and two completion resistors and is distinguished from conventional bridge circuits in that the resistance of the completion resistors substantially exceeds the value of any other resistors in the bridge circuit. The cables are used to connect the active and dummy resistors which are at the elevated temperatures to the completion resistors which are at room temperature. Heat induced resistance changes in the cables normally produce the zero offset because the cables form a part of the bridge circuit and are heated unevenly; however, the high value of completion resistors incorporated in the present invention tend to nullify the resistance changes in the cables and thereby eliminate the zero offset.

3 Claims, 2 Drawing Figures

TRAIN GAGE MEASUREMENT CIRCUIT FOR HIGH TEMPERATURE APPLICATIONS USING HIGH VALUE COMPLETION RESISTORS

BACKGROUND

1. Field of the Invention

This invention pertains to a measurement circuit for a half bridge resistance strain gage and, more particularly, to a bridge circuit in which the cable resistance is placed in series with very high resistance completion resistors to eliminate the apparent strain errors due to changes in cable resistance produced by heating.

2. Prior Art

FIG. 1 illustrates a prior art strain gage as used in a conventional Wheatstone bridge circuit, comprising an active resistor (RA) 101, a dummy resistor (RD) 102, a first completion resistor (RCA) 107, and a second completion resistor (RCB) 108.

In a typical application, the active and dummy resistors are attached to a member which is subject to strain; however, the strain is transmitted only to RA. This member is often located in a higher temperature area, making it necessary to remotely locate the remainder of the circuitry. For example, the completion resistors are typically located remotely from the active and dummy resistors by means of leads which are represented in FIG. 1 by their equivalent resistances (RLA) 103A, (RLB) 103B and (RLC) 103C. FIG. 1 also shows a temperature compensating resistor (RTC) 105 and a balancing resistor (RBAL) 106 placed in series between lead 103A and RCA to aid in temperature compensating the bridge. Power for the bridge is supplied from a source 110 and is applied to the bridge at the junction of the balancing resistor and the temperature compensating resistor, and at the junction of the lead 103B and the completion resistor RCB. The bridge output voltage is measured at terminals 109 which are located in series with lead 103C and the junction of the completion resistors RCA and RCB. It should be noted that although leads 103A, 103B and 103C are drawn as separate lines, they may be joined in a single cable or run as shown, depending on the application.

In a fundamental Wheatstone bridge circuit, there are only four resistors, RA, RD, RCA and RCB. The circuit of FIG. 1 can be viewed as such a circuit by considering the value of all other resistors as zero. In the operation of this circuit, the bridge is initially adjusted to provide an output voltage at terminals 109 of zero volts. This is referred to as zero setting or zeroing. To zero set the bridge, the voltage produced at the junction of the RA and RD must be equal to the voltage produced at the junction of RCA and RCB. Since RA and RD form a first voltage divider supplied by source 110, and RCA and RCB from a second voltage divider supplied by the same source, the following relationship may be written:

$$RA/(RA+RD) = RCA/(RCA+RCB) \text{ and,} \quad (1)$$

$$RD/(RA+RB) = RCB/(RCA+RCB) \quad (2)$$

By dividing these two equations the following equation results:

$$RA/RD = RCA/RCB \quad (3)$$

Equation (3) is a well known equation showing the relationship of the resistance in each arm of the Wheatstone bridge.

In the most common applications of the Wheatstone bridge, the value of an unknown resistance is found by inserting it in the bridge circuit to form one arm of the bridge. The value of one or more of the other known resistances in the bridge arms are then varied to produce a zero output voltage. The resulting values of the known resistors after adjustment are substituted in Equation (3) to find the value of the unknown resistor.

In strain gage applications, the bridge is used in a different manner, but the equations still applied. In strain gage applications, the resistances are all known values, but the active element is placed under strain (elongated or compressed) by bonding or welding it to a structural member under test which is subject to a strain. The resistance of the active element, RA, changes in a known manner as it is strained, making a measurement of its resistance an indicator of the strain being experienced by the member under test. The measurement of the change in resistance of the active element is made by measuring the change in the output voltage. Unlike the conventional use of the bridge, no attempt is made to zero the bridge after the initial zeroing. The value of the remaining resistors in the bridge are left unchanged.

The output voltage is given by the difference between the two voltage divider outputs:

$$E_{out} = E_{in}\left[\frac{RA}{R_A + R_D} - \frac{RCA}{RCA + RCB}\right] \quad (4)$$

The change in output voltage with respect to the change in the active resistance is found by differentialing equation (4):

$$\frac{dE_{out}}{dR_A} = \frac{E_{in} R_D}{(R_A + R_D)^2} \quad (5)$$

A gage factor, F, is defined as follows:

$$F = \frac{dR_A/R_A}{dL/L} \quad (6)$$

Where:
$dR_A$ = The change in the resistance RA
$R_A$ = The value of resistance of the active resistor
$dL$ = The change in the length of the member strained
$L$ = The length of the member over which the strain is measured.

The strain gage factor may be considered as the ratio of the percent change in the resistance of $R_A$ to the percent change in length of the member under test.

Substituting the gage factor F into Equation (5), we have:

$$dE_{out} = E_{in} \frac{RA \cdot RD}{(RA + RD)^2} F \frac{dL}{L} \quad (7)$$

Where RA and RD are equal, Equation (7) reduces to:

$$dE_{out} = \frac{E_{in}F}{4} \frac{dL}{L} \qquad (8)$$

If the bridge is zeroed first, Equation (8) represents the output voltage $E_{out}$ as indicated in Equation (9)

$$E_{out} = \frac{E_{in}F}{4} \frac{dL}{L} \qquad (9)$$

Where the active resistor is subject to a temperature that differs from that of the dummy resistor, or these resistors have a different temperature coefficient, the circuit may be compensated by using a temperature compensating resistor RTC 105. However, the addition of the RTC upsets the zero balance of the bridge. To overcome this and balance the bridge, the balancing resistor RBAL 106 is added. In a practical circuit, the RTC and RBAL are small in comparison to the other resistors in the bridge. For example, the active, dummy and completion resistors are typically in the order of 120 ohms, while the temperature compensating and balancing resistors are typically 15 ohms.

Although the prior art circuitry is commonly used, it presents a number of serious problems in obtaining accurate results. The principal problem occurs when both the gage elements and the cable are subjected to varying temperatures which change their resistances by very sizeable amounts. Despite the fact that the cable resistances 103A, 103B and 103C in each leg approximately track each other, the effects of heating in the two arms of the bridge to which 103A and 103C are connected are not simply accounted for. The reason for this can be understood by noting that the contribution of each bridge arm to the output signal is proportional to its change in resistance divided by its total original resistance or $\Delta R/R$. Even though $\Delta R$ may be the same in both arms of the bridge, R never is the same so that $\Delta R/R$ is different for the two arms, resulting in a zero shift or apparent strain signal from merely heating more or less cable than was heated during temperature calibration.

Unfortunately, the temperature compensating resistor RTC 105 exaggerates this effect and the magnitude of the error is impossible to theoretically predict to an acceptable accuracy, making it necessary to characterize the gage and cable by measurement with different amounts of cable held at elevated temperatures. Such measurements provide an apparent strain which depends on gage temperature and actual cable resistance. The variable cable resistance also changes the strain sensitivity of the active arm of the bridge, making knowledge of the cable resistance important for accurate results. It is not convenient to measure these resistance because the gage portion of the bridge must be disconnected from the remainder of the bridge.

The measurement of the cable resistances can be simplified by adding additional leads, referred to as cable conductors, which permit the cable resistance to be measured directly without disconnecting the cable leads, but data correction is complicated and true compensation is usually not obtained, except in very controlled circumstances of cably heating, not often achieved in practical cases.

SUMMARY

An object of this invention is to eliminate the difficulty in predicting the effects of cable heating on the output signal of a strain gage.

An object of this invention is to provide a convenient measurement of the effect of heating cable on bridge voltage to be used in data correction.

In effect, the present invention removes the cable conductors from the arms of the strain gage bridge, where they have large effects, and places them in series with the completion resistance, where they will have little effect, because high resistance completion resistors are used. In the completion resistor portion of the circuit, the effect of a change in cable resistance is negligible. The circuit functions very much like a full four arm bridge transducer which has all four elements at the sensor end of the cable. The full bridge configuration is ideal since all the cable is external to the bridge and does not effect zeroing. Effectively, the full bridge circuit arrangement is achieved with the present invention; however, the actual physical construction of the gage is simplified to that of a half bridge permitting a less complicated circuit to be subject to the high temperature environment. Correction of measured data to compensate for heating effects is greatly simplified over that required for a standard circuit because all cable heating effects are either eliminated or easily measured.

DETAILED DESCRIPTION OF THE INVENTION

Figure 1:
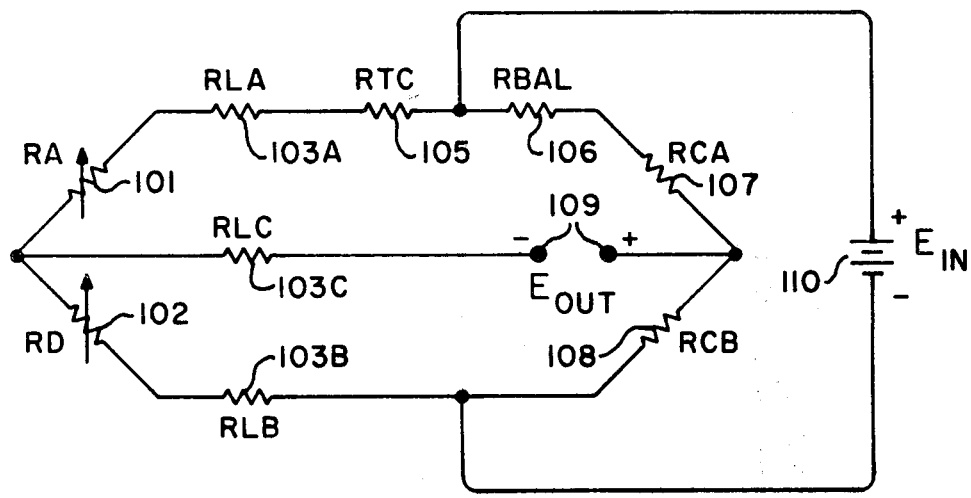
FIG. 1 is a standard strain gage bridge measurement circuit.
Figure 2:
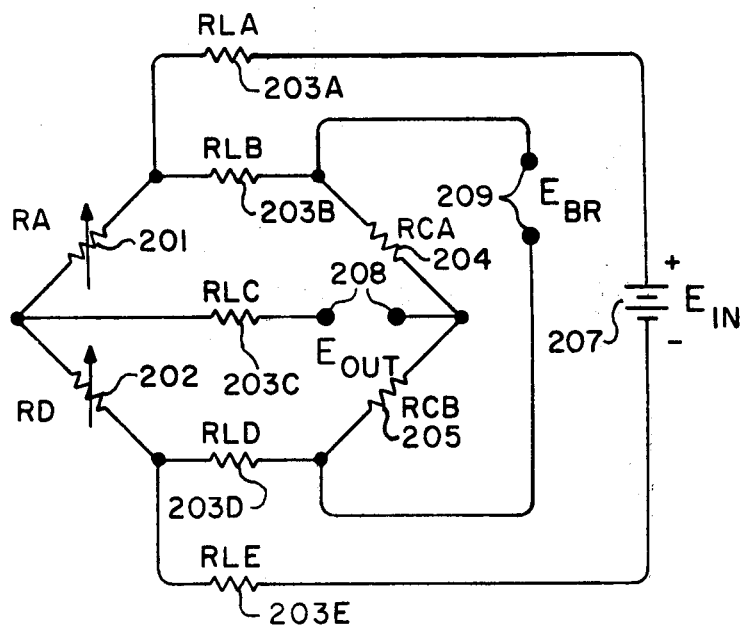
FIG. 2 is a schematic diagram of the bridge circuit with very high resistance completion resistors.

Referring to FIG. 2, the bridge circuit of the present invention is shown to comprise an active resistor (RA) 201, a dummy resistor (RD) 202, five leads represented by their resistance RLA through RLE, designated by drawing numerals 203A through 203E, completion resistors RCA and RCB designated by drawing numerals 204 and 205 respectively, bridge output voltage terminals 208, bridge supply voltage $E_{in}$ designated by drawing numeral 207 and terminals 209 across which the actual bridge voltage, $E_{BR}$, may be measured.

The active and dummy resistor are placed in an area in which strain is to be measured. Since this also may be an area subject to elevated temperatures, the remaining portions of the bridge are remotely located by means of the cable leads 203A through 203E. The leads are usually combined into a single cable, but may be left as separate leads in the manner shown.

The use of leads presents a number of problems. The supply leads in series with the bridge represent resistance between the bridge and the supply voltage source and, unfortunately, have the effect of reducing the bridge excitation voltage and thus strain sensitivity. This effect is quite predictable if the voltage drops through RLA and RLE, which carry the excitation voltage are known. There is a simple way to measure these drops, which will be described later. The resistances RLB and RLD, which are inside the bridge, are much more critical, as they affect the balance of the bridge. Variations in operating temperatures can cause these lead resistances to vary as much as 25 percent between heated and cold cable readings. In addition, the initial room temperature resistances differ by one or two tenths of an ohm and these resistances may mistrack one another by an additional one or two tenths of an ohm as the cable temperature is increased.

In a bridge in which RA and RD are 120Ω, a 0.2Ω change in one arm is equivalent to about 400µε. The symbols µε is referred to as microstrain. It is equal to the change in length per unit length multiplied by $10^6$. Any resistance change which occurs in both completion legs will cancel and give no output signal, but if one conductor changes by 0.2Ω more than the other, then that 0.2Ω will not be cancelled, and a 400µε zero shift will occur in the instrument reading. The result is an apparent strain error due to heating the cable containing the leads. The magnitude of this error is proportional to the percent change in resistance or 0.2Ω divided by 120Ω which is 0.167%. By making the completion resistors RCA and RCB, which are in series with the cable resistances, very large, it is possible to reduce the percent increase in resistance of an arm to almost zero. Where RCA and RCB are chosen to be 100K ohm resistors for example, an increase in resistance of 0.2Ω is equivalent to a change of only 0.002%, which is much less than a one microstrain error. For this reason, the cable resistance effect on the bridge balance and therefore apparent strain can be made to be negligible through the use of the circuit shown in FIG. 2.

The resistances RLA and RLE from the supply voltage source, Ein, have the effect of reducing the voltage applied to the bridge and this reduction will vary as cable and gage resistances change with changes in temperature. However, as long as the voltage reaching the bridge, referred to as the bridge voltage $E_{BR}$, is known, any drops in RLA and RLE are known and may be accounted for. This results in no error due to the heating of these leads. The present invention makes the elimination of these errors convenient, because it is possible to directly measure $E_{BR}$ at terminals 209. The voltage at these terminals is not exactly equal to the actual bridge voltage because of the drops in RLB and RLD, but the high completion resistor values RCA and RCB make the drops negligible. For example, if RLB and RLD were as high as 45Ω and the completion resistors were 100K ohm each, then the ratio of $E_{BR}$ to actual bridge voltage is given by $$\frac{E_{BR} \text{ (meas.)}}{E_{BR} \text{ (Actual)}} = \frac{200000}{200090} = .99955 \qquad (10)$$

This amounts to a negligible error of only 0.045%. It can be seen from the above that the present invention can eliminate apparent strain errors due to lead resistances and also eliminate the need to correct the bridge voltage as measured at terminals 209. Although this circuit does not include temperature compensation, it may be characterized during factory calibration to provide information with which to correct the data.

The circuit functions essentially as a full bridge transducer with a cable connecting the two halves of the bridge, however, it is considerably easier to manufacture than a conventional bridge because only two resistors are used in the active area and only those two need to be placed at the end of a cable. In addition, the circuit can be balanced, and its thermal response is more repeatable and predictable than a true full bridge with four bridge arms subjected to the high temperature environment.

The circuit can be made self temperature compensating by using an active element resistor fabricated from a material such as that made under the trade name Evanohm. Evanohm is an alloy which can be heat treated for self temperature compensation, eliminating the high output produced by a high temperature enviroment when the more commonly used platinum tungsten elements are employed.

Having described my invention, I claim:

1. A bridge circuit for a strain gage of the type having an active, a dummy, and two completion resistors wherein one terminal of the active and the dummy resistors are joined at a first junction, and one terminal of each of the completion resistors are joined at a second junction, the remaining terminals of the active and dummy resistors are each separately connected to one of the unconnected terminals of one of the completion resistors, at a third and fourth junction, respectively, power being supplied to bridge across the third and fourth junctions and output voltage being measured across the first and second junctions, said bridge circuit being characterized in that the resistance of the completion resistors substantially exceeds the value of any other resistance in the bridge circuit.

2. A bridge circuit as claimed in claim 1, wherein the resistance of the dummy resistor is equal to that of the active resistor, the resistance of the completion resistors are essentially equal to each other, and the resistance of the completion resistors is nominally one-thousand times that of the active resistor.

3. A bridge circuit as claimed in claim 1, further comprising:
(a) a first cable having two leads, one of which completes the third junction and one of which completes the fourth junctions by connecting, through the cable, the resistors forming the junction so that the completion resistors may be located remotely from the active and dummy resistors,
(b) a second cable having two leads connected to the junction of the first cables with the active and dummy resistors in order to supply remotely located power to the bridge by way of the second set of leads,
(c) a third cable having two leads with one lead connected to the first junction and the other lead connected to second junction to provide a means for measuring the bridge output voltage at a location remote from the bridge, and
(d) a fourth cable having two leads, each connected to one of the junctions of the leads of the first cable and the completion resistor to measure from a remote location a voltage substantially equal to the bridge voltage across the series connection of the active and dummy resistors and thereby substantially eliminate the effects of the resistive drop in the second cable.

\* \* \* \* \*

UNITED STATES PATENT OFFICE
CERTIFICATE OF CORRECTION

PATENT NO. : 4,417,477
DATED : Nov. 29, 1983
INVENTOR(S) : Ronald I. Poff

It is certified that error appears in the above-identified patent and that said Letters Patent are hereby corrected as shown below:

First word in Title "Train" should be --Strain--

Signed and Sealed this

Seventh Day of February 1984

[SEAL]

Attest:

GERALD J. MOSSINGHOFF

Attesting Officer     Commissioner of Patents and Trademarks